(12) United States Patent
Oya et al.

(10) Patent No.: US 9,424,961 B2
(45) Date of Patent: Aug. 23, 2016

(54) INSULATED WIRE, AND ELECTRIC/ELECTRONIC EQUIPMENTS, MOTOR AND TRANSFORMER USING THE SAME

(71) Applicants: FURUKAWA ELECTRIC CO., LTD., Tokyo (JP); FURUKAWA MAGNET WIRE CO., LTD., Tokyo (JP)

(72) Inventors: Makoto Oya, Tokyo (JP); Daisuke Muto, Tokyo (JP); Keiichi Tomizawa, Tokyo (JP)

(73) Assignees: Furukawa Electric Co., Ltd., Tokyo (JP); Furukawa Magnet Wire Co., Ltd., Tokyo (JP)

(*) Notice: Subject to any disclaimer, the term of this patent is extended or adjusted under 35 U.S.C. 154(b) by 0 days.

(21) Appl. No.: 14/921,149

(22) Filed: Oct. 23, 2015

(65) Prior Publication Data

US 2016/0055940 A1 Feb. 25, 2016

Related U.S. Application Data

(63) Continuation of application No. PCT/JP2014/061282, filed on Apr. 22, 2014.

(30) Foreign Application Priority Data

Apr. 26, 2013 (JP) ................. 2013-094724

(51) Int. Cl.
*H01F 27/30* (2006.01)
*H01B 7/02* (2006.01)
(Continued)

(52) U.S. Cl.
CPC .............. *H01B 7/0216* (2013.01); *H01B 3/303* (2013.01); *H01B 3/306* (2013.01); *H01B 7/0009* (2013.01);
(Continued)

(58) Field of Classification Search
CPC .. H01F 27/00–27/30; H01B 3/30; H01B 3/44
USPC ............ 336/65, 90–96, 206–208; 174/110 R, 174/110 SR
See application file for complete search history.

(56) References Cited

U.S. PATENT DOCUMENTS

| 4,000,362 A | 12/1976 | Kawaguchi et al. |
| 5,115,103 A * | 5/1992 | Yamanishi ................ C08J 9/32 174/101.5 |

(Continued)

FOREIGN PATENT DOCUMENTS

| JP | 50-54801 A | 5/1975 |
| JP | 6-162826 A | 6/1994 |

(Continued)

OTHER PUBLICATIONS

International Search Report, issued in PCT/JP2014/061282, dated Jul. 22, 2014.
(Continued)

*Primary Examiner* — Tuyen Nguyen
(74) *Attorney, Agent, or Firm* — Birch, Stewart, Kolasch & Birch, LLP

(57) ABSTRACT

An insulated wire having a rectangular shaped cross-section, containing: a conductor having a rectangular shaped cross-section; and an insulating layer coated on the conductor, in which the insulating layer has a foamed layer composed of a thermosetting resin containing bubbles, the cross-section of the insulating layer has a shape composed of a flat portion and a corner portion, and the insulating layer satisfies the relationship represented by the following formula:

$$\in_1 < 3 \text{ and } (T_2/\in_2) > (T_1/\in_1)$$

wherein $T_1$ [μm] represents a thickness of the flat portion; $\in_1$ represents a relative dielectric constant of the flat portion; $T_2$ [μm] represents a thickness of the corner portion; and $\in_2$ represents a relative dielectric constant of the corner portion, and an electric/electronic equipment, a motor, or a transformer, using the insulated wire.

6 Claims, 4 Drawing Sheets

(51) Int. Cl.
  *H01F 27/02* (2006.01)
  *H01F 5/06* (2006.01)
  *H02K 3/30* (2006.01)
  *H02K 3/34* (2006.01)
  *H01B 13/06* (2006.01)
  *H01F 27/28* (2006.01)
  *H01B 7/00* (2006.01)
  *H01B 3/30* (2006.01)

(52) U.S. Cl.
  CPC ............ *H01B 7/0283* (2013.01); *H01B 13/065* (2013.01); *H01F 5/06* (2013.01); *H01F 27/02* (2013.01); *H01F 27/2823* (2013.01); *H01F 27/30* (2013.01); *H02K 3/30* (2013.01); *H02K 3/34* (2013.01); *H01B 3/308* (2013.01)

(56) References Cited

U.S. PATENT DOCUMENTS

| | | | |
|---|---|---|---|
| 2009/0202831 A1* | 8/2009 | Honda | C08G 73/1042 428/383 |
| 2011/0195197 A1* | 8/2011 | Abe | H01B 13/148 427/508 |
| 2012/0090871 A1 | 4/2012 | Kato et al. | |
| 2012/0279752 A1 | 11/2012 | Oya et al. | |
| 2013/0014971 A1 | 1/2013 | Muto et al. | |
| 2013/0037304 A1 | 2/2013 | Ikeda et al. | |

FOREIGN PATENT DOCUMENTS

| | | |
|---|---|---|
| JP | 2009-123418 A | 6/2009 |
| JP | 2011-238384 A | 11/2011 |
| JP | 2012-224714 A | 11/2012 |
| JP | 2012-234625 A | 11/2012 |
| WO | WO 2011/118717 A1 | 9/2011 |

OTHER PUBLICATIONS

Chinese Office Action dated May 26, 2016, issued in corresponding Chinese Patent Application No. 201480003564.9.

* cited by examiner

INSULATED WIRE, AND ELECTRIC/ELECTRONIC EQUIPMENTS, MOTOR AND TRANSFORMER USING THE SAME

CROSS-REFERENCE TO RELATED APPLICATIONS

This application is a continuation of PCT/JP2014/061282 filed on Apr. 22, 2014 which claims benefit of Japanese Patent Application No. 2013-094724 filed on Apr. 26, 2013, the subject matters of which are incorporated herein by reference in their entirety.

TECHNICAL FIELD

The present invention relates to an insulated wire, and electric/electronic equipments, a motor and a transformer using the same.

BACKGROUND ART

Inverters have been installed in many types of electric equipment such as a motor used in a vehicle, as an efficient variable-speed control unit. However, the inverters are switched at a frequency of several kHz to tens of kHz, to cause a surge voltage at every pulse thereof. Inverter surge is a phenomenon in which reflection occurs at a breakpoint of impedance, for example, at a starting end, a termination end, or the like of a connected wire in a propagation system, and as a result, a voltage up to twice as high as an inverter output voltage is applied. In particular, an output pulse occurred due to a high-speed switching device, such as an IGBT (Insulated Gate Bipolar Transistor), is high in steep voltage rise. Accordingly, even if a connection cable is short, the surge voltage is high, and further, voltage decay due to the connection cable is low. As a result, a voltage almost twice as high as the inverter output voltage occurs.

For coils for electric equipment such as inverter-related equipment, for example, high-speed switching devices, inverter motors and transformers, insulated wires, which are enameled wires, are mainly used as magnet wires. Accordingly, as described above, since a voltage nearly twice as high as the inverter output voltage is applied in the inverter-related equipment, it has been required in the insulated wires to minimize partial discharge deterioration, which is attributable to inverter surge.

In general, the term "partial discharge deterioration" means a phenomenon in which the following deteriorations of an electric insulating material occur in a complicated manner: molecular chain breakage deterioration caused by collision with charged particles that have been generated by partial discharge (discharge at a portion in which fine void defect and the like exist); sputtering deterioration; thermal fusion or thermal decomposition deterioration caused by local temperature rise; or chemical deterioration caused by ozone generated due to discharge, and the like. The electric insulating materials which actually have been deteriorated by partial discharge show reduction in the thickness.

On the other hand, with downsizing and becoming higher frequency of the electric equipment, in recent years, rectangular wires which are able to increase a space factor have attracted attention. For example, the application of the rectangular wire to motors for vehicles has been advanced. In the rectangular wires, when these wires lie adjacent to each other, air gaps (voids) are easily formed at a corner portion, and further, when a curvature radius of a conductor corner is small, electric field concentration is caused, so that a partial discharge easily generates.

In order to solve a problem of the above partial discharge, an attempt has been made to increase the thickness of an insulating film of the rectangular wire. For example, to coat an enameled rectangular wire with a thermoplastic resin is proposed (see Patent Literature 1). However, to increase the thickness of the insulating film decreases a space factor of the wire and thus has room for improvement. Further, an attempt has been made to decrease a dielectric constant of the insulating film (see Patent Literatures 2 and 3). However, even the case where these resins are used in the insulating film still has room for improvement in a partial discharge inception voltage.

CITATION LIST

Patent Literatures

Patent Literature 1: JP-A-2009-123418 ("JP-A" means unexamined published Japanese patent application)
Patent Literature 2: JP-A-2012-234625
Patent Literature 3: JP-A-2012-224714

SUMMARY OF INVENTION

Technical Problem

The present invention was achieved in order to solve the problems described above, and the present invention is contemplated for providing an insulated wire having reduced the thickness of an insulating film (insulating layer) thereby to increase a space factor of the wire and further having improved an insulation property of a corner portion of a rectangular wire, while maintaining a high partial discharge inception voltage, and electric/electronic equipments, a motor and a transformer, using the foregoing insulated wire.

Solution to Problem

As a result of intensive studies in order to solve the problems described above, the present inventors have found that by forming an insulating film composed of a thermosetting resin incorporating therein cells babbles and also by defining a relation between a permittivity and a thickness of the insulating film at a flat portion and a corner portion thereof, a high partial discharge inception voltage can be achieved even in a thin insulating layer, and also insulation properties at the corner portion of the rectangular wire can be enhanced, so that reduction in the partial discharge inception voltage at the corner portion can be suppressed. The present invention has been completed on the basis of this findings.

That is, the above-described problems can be solved by the following means.
(1) An insulated wire having a rectangular shaped cross-section, comprising:
a conductor having a rectangular shaped cross-section; and
an insulating layer coated to the conductor,
wherein the insulating layer has a foamed layer composed of a thermosetting resin containing bubbles, the cross-section of the insulating layer has a shape composed of a flat portion and a corner portion, and the insulating layer satisfies the relationship represented by the following formula:

$$\in_1 < 3 \text{ and } (T_2/\in_2) > (T_1/\in_1)$$

wherein $T_1$ [μm] represents a thickness of the flat portion; $\in_1$ represents a relative dielectric constant of the flat portion; $T_2$ [μm] represents a thickness of the corner portion; and $\in_2$ represents a relative dielectric constant of the corner portion.

(2) The insulated wire as described in the above item (1), wherein the insulating layer further satisfies the relationship represented by formula: $(T_1/\in_1)>15$.

(3) The insulated wire as described in the item (1) or (2), comprising non-foamed layer containing no bubble, on the inner periphery and/or the outer periphery of the foamed layer.

(4) The insulated wire as described in any one of the items (1) to (3), wherein the foamed layer comprises at least one thermosetting resin selected from the group consisting of a polyamideimide resin and a polyimide resin.

(5) The insulated wire as described in any one of the items (1) to (4), wherein the insulating layer comprises an extruded layer, and wherein the extruded layer comprises a crystalline thermoplastic resin having a relative dielectric constant of 4 or less and a melting point of 260° C. or more.

(6) An electric/electronic equipment, a motor, or a transformer, comprising the insulated wire as described in any one of the items (1) to (5).

In the specification, any numerical expressions in a style of "... to ..." is used to indicate a range including the lower and upper limits represented by the numerals given before and after "to", respectively.

Advantageous Effects of Invention

The present invention can provide an insulated wire having reduced the thickness of an insulating film thereby to increase a space factor of the wire and further having improved an insulation property at a corner portion of a rectangular wire, while maintaining a high partial discharge inception voltage, and an electric/electronic equipment, a motor and a transformer, using the foregoing insulated wire. In the specification, the term "rectangular wire" represents a conductor having a rectangular cross-section or an insulated wire having a rectangular cross-section.

In particular, the insulated wire of the present invention has a foamed layer composed of a thermosetting resin incorporating therein bubbles on a conductor having a rectangular shaped cross-section, and the relative dielectric constant of an insulated film at a flat portion is less than 3, so that a partial discharge inception voltage is high. Further, in the insulated wire of the present invention, by satisfying the above-described relationship represented by the specific formula between the thickness and the relative dielectric constant of the insulating film at the flat portion and the corner portion, an insulation property at the corner portion are enhanced, so that reduction in the partial discharge inception voltage at the corner portion can be suppressed. In addition, by satisfying a relationship represented by formula: $(T_1/\in_1)>15$, the partial discharge inception voltage can be further increased.

On the other hand, in the insulated wire of the present invention, the presence of the non-foamed layer(s) containing no bubble, on the inner periphery and/or the outer periphery of the foamed layer enables an improvement in a dielectric breakdown property, a tensile strength and an abrasion resistance of the insulating film. Further, the insulated wire of the present invention is excellent in heat resistance due to adoption of a polyamideimide resin and/or a polyimide resin as the resin of the foamed layer.

Further, by disposing an extruded layer composed of a resin having a particular relative dielectric constant and a particular melting point for the outermost layer of the insulating layer, the thickness of the insulating layer can be enlarged without deteriorating a relative dielectric constant and a heat resistance of the insulating layer, and also a partial discharge inception voltage can be further increased.

For this reason, a winding composed of the insulated wire of the present invention allows the production of a coil having a high space factor, so that the winding can be favorably used for high-performing motors and transformers.

Other and further features and advantages of the invention will appear more fully from the following description, appropriately referring to the accompanying drawings.

DESCRIPTION OF EMBODIMENTS

Figure 1:
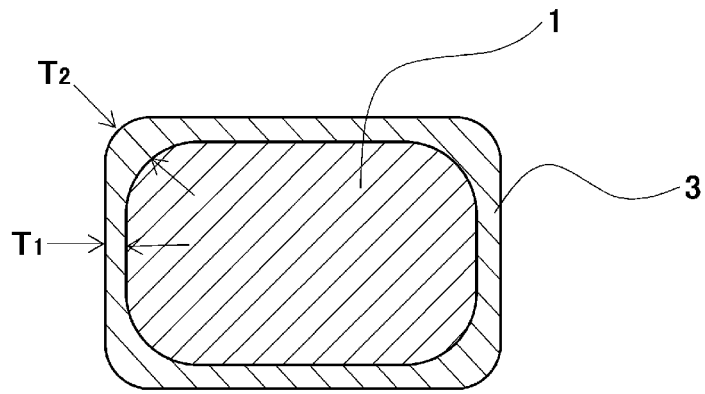
FIG. 1 is a cross-sectional view schematically showing an insulated wire of a first embodiment of the present invention.

First, the insulated wire of the present invention is described below in detail.

<<Insulated Wire>>

The insulated wire of the present invention has a rectangular shaped cross-section and comprises a conductor having a rectangular shaped cross-section and an insulating layer coated to the conductor, in which the insulating layer has a foamed layer composed of a thermosetting resin containing bubbles, the cross-section of the insulating layer has a shape composed of flat portions and corner portions, and the insulating layer satisfies the relationship represented by the following formula:

$$\in_1 < 3 \text{ and } (T_2/\in_2) > (T_1/\in_1)$$

wherein $T_1$ [μm] represents a thickness of the flat portion; $\in_1$ represents a relative dielectric constant of the flat portion; $T_2$ [μm] represents a thickness of the corner portion; and $\in_2$ represents a relative dielectric constant of the corner portion.

The phrase "the insulating layer has a foamed layer" means both cases, i.e., one case where the insulating layer itself is a foamed layer, and the other case where the insulating layer is composed of plural layers and one of the plural layers is a foamed layer.

The insulated wire of the present invention is explained below, with referring to the drawings.

Examples of preferable embodiments of the insulated wire of the present invention are shown in FIGS. 1 to 6. However, the insulated wire of the present invention is not limited to these embodiments.

In the cross-sectional view of the insulated wire of the present invention shown in FIG. 1 as one embodiment thereof, a foamed layer 3 composed of a thermosetting resin incorporating therein bubbles is formed as an insulating layer on a conductor 1 having a rectangular cross-section, in such a way that the thickness of the insulating layer at the corner portions is formed larger than the flat portions thereof.

Figure 2:
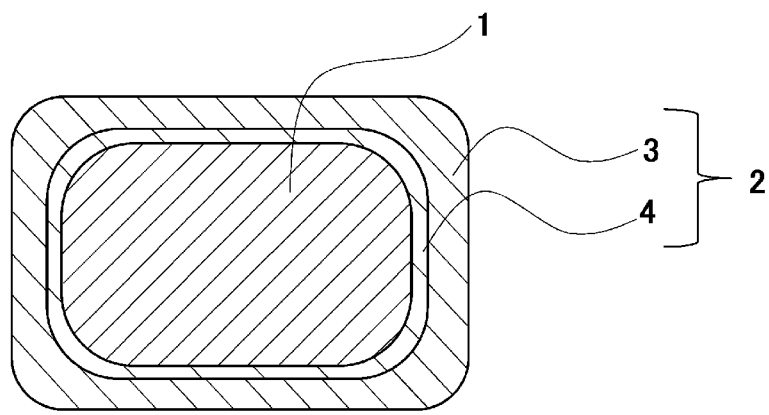
FIG. 2 is a cross-sectional view schematically showing an insulated wire of a second embodiment of the present invention.

In the cross-sectional view of the insulated wire of the present invention shown in FIG. 2 as another embodiment thereof, an insulating layer 2 in which a foamed layer 3 having thicker corner portions than flat portions thereof is laminated on the outer periphery of an inner non-foamed layer 4 containing no bubble, is formed on a conductor 1 having a rectangular cross-section.

Figure 3:
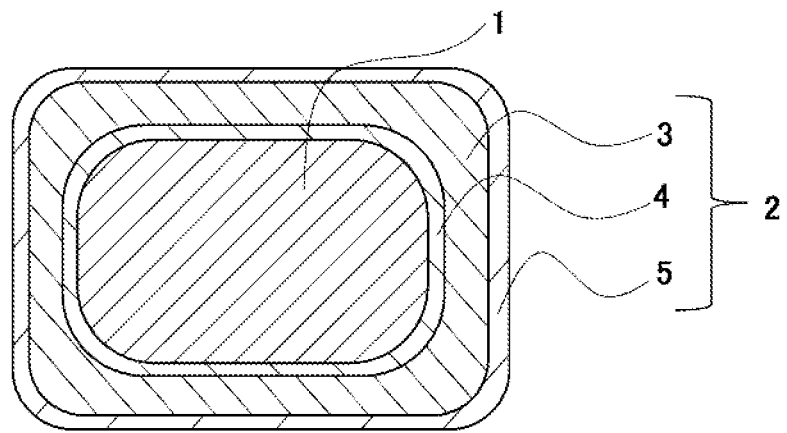
FIG. 3 is a cross-sectional view schematically showing an insulated wire of a third embodiment of the present invention.

In the cross-sectional view of the insulated wire of the present invention shown in FIG. 3 as still another embodiment thereof, an insulating layer 2, in which a foamed layer 3 having thicker corner portions than flat portions thereof is laminated on the outer periphery of an inner non-foamed layer 4 containing no bubble and an outer non-foamed layer 5 is further laminated on the outer periphery of the foamed layer 3, is formed on a conductor 1 having a rectangular cross-section.

Figure 4:
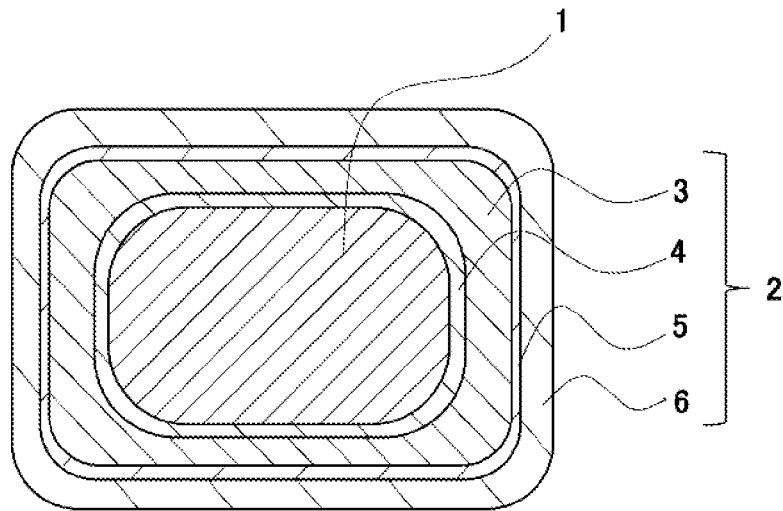
FIG. 4 is a cross-sectional view schematically showing an insulated wire of a fourth embodiment of the present invention.

In the cross-sectional view of the insulated wire of the present invention shown in FIG. 4 as still another embodiment thereof, an insulating layer 2, in which a foamed layer 3 having thicker corner portions than flat portions thereof is laminated on the outer periphery of an inner non-foamed layer 4 containing no bubble and an outer non-foamed layer 5 is further laminated on the outer periphery of the foamed layer 3 and an extruded layer 6 is further laminated on the outer periphery of the outer non-foamed layer 5, is formed on a conductor 1 having a rectangular cross-section.

Figure 5:
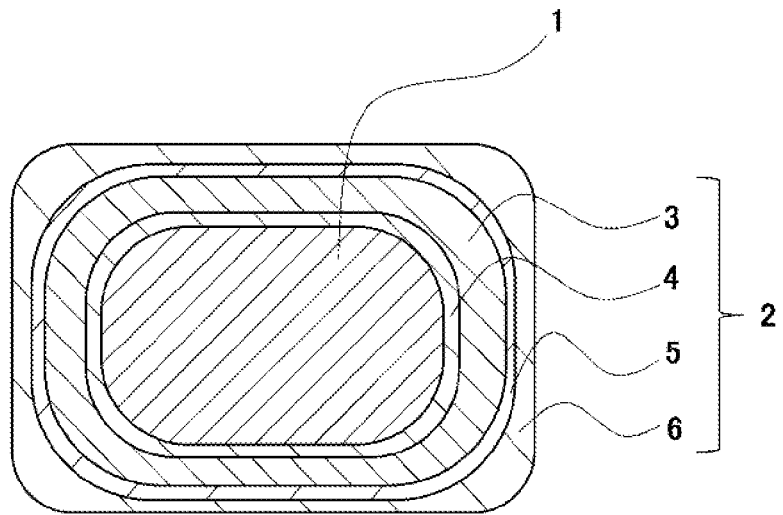
FIG. 5 is a cross-sectional view schematically showing an insulated wire of a fifth embodiment of the present invention.

The cross-sectional view of the insulated wire of the present invention shown in FIG. 5 is a variation of FIG. 4, and an insulating layer 2, in which a foamed layer 3 is laminated on the outer periphery of an inner non-foamed layer 4 containing no bubble and an outer non-foamed layer 5 is further laminated on the outer periphery of the foamed layer 3 and an extruded layer 6 having thicker corner portions than flat portions thereof is further laminated on the outer periphery of the outer non-foamed layer 5, is formed on a conductor 1 having a rectangular cross-section.

Figure 6:
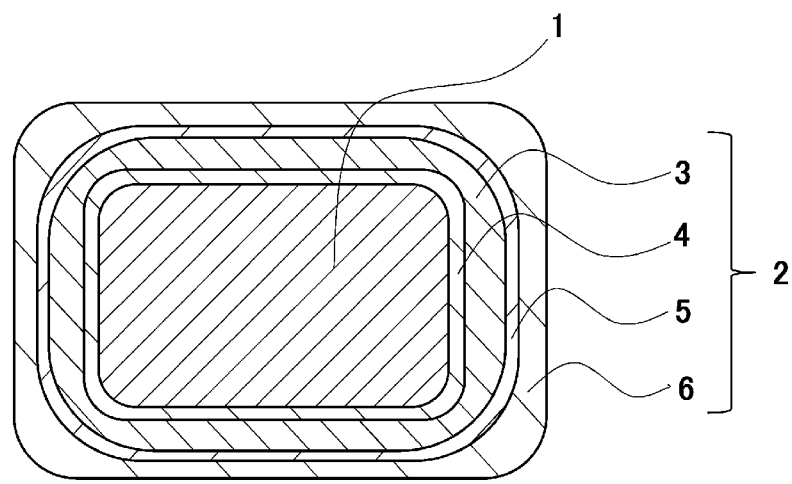
FIG. 6 is a cross-sectional view schematically showing an insulated wire of a sixth embodiment of the present invention.

The cross-sectional view of the insulated wire of the present invention shown in FIG. 6 is a second variation of FIG. 4, and an insulating layer 2, in which a foamed layer 3 having thinner corner portions than flat portions thereof is laminated on the outer periphery of an inner non-foamed layer 4 containing no bubble and an outer non-foamed layer 5 is further laminated on the outer periphery of the foamed layer 3 and an extruded layer 6 having thicker corner portions than flat portions thereof is further laminated on the outer periphery of the outer non-foamed layer 5, is formed on a conductor 1 having a rectangular cross-section.

Further, the conductor and the insulating layer is explained below in series.

(Conductor)

As to the conductor 1 used for the insulated wire of the present invention, those which have been conventionally used for an insulated wire can be used. Examples thereof include conductive metals, specifically copper, aluminum, and an alloy thereof, preferably a low-oxygen copper whose oxygen content is 30 ppm or less, and more preferably a low-oxygen copper whose oxygen content is 20 ppm or less or oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

The cross-sectional shape of the conductor is preferably a shape whose cross-sectional area becomes large, and in terms of space factor with respect to a stator slot, it is preferable to use a conductor having a cross-sectional shape except for a circular shape. In the present invention, a conductor having a rectangular-shaped cross-section is used. A conductor having chamfers (curvature radius R) at four corners thereof is preferred, in terms of suppressing partial discharge from corner portions. The curvature radius R is preferably approximately 0.5 mm or less, and more preferably in a range of 0.2 to 0.4 mm. The cross-sectional size (width) of the conductor is not limited in particular, but the long side is preferably in a range of approximately 1 to 5 mm. The length ratio of the short side and the long side is preferably in the range of approximately 1:1 to 1:4.

(Insulating Layer)

The insulating layer used in the present invention has a foamed layer containing a thermosetting resin incorporating therein bubbles. The foamed layer may have a non-foamed layer(s) containing no bubble, on the inner periphery and/or the outer periphery thereof. An extruded layer may be disposed on the outer periphery thereof. The insulating layer is formed by coating on a conductor having a rectangular cross-section, as shown in FIGS. 1 to 6.

The insulating layer is formed so as to satisfy the relationship represented by formula: $\in_1 < 3$ and $(T_2/\in_2) > (T_1/\in_1)$ wherein $T_1$ [μm] represents a thickness of the flat portion, $\in_1$ represents a relative dielectric constant of the flat portion, $T_2$ [μm] represents a thickness of the corner portion, and $\in_2$ represents a relative dielectric constant of the corner portion. The term "flat portion" is defined as a portion of an insulating layer which coats a flat portion of a conductor, while the term "corner portion" is defined as a portion of an insulating layer which coats a corner portion of a conductor.

From the viewpoint of the partial discharge inception voltage, $\in_1$ is preferably 2.8 or less, further preferably 2.5 or less, and particularly preferably 2.3 or less. The lower limit is not limited, but practically approximately 1.5. From the viewpoint of strengthening an insulation property of the corner portion, the value of $(T_2/\in_2)/(T_1/\in_1)$ is preferably at least 1.05, and more preferably in a range of 1.1 to 1.3. Further, if the relationship represented by formula: $(T_1/\in_1) > 15$ is satisfied, the partial discharge inception voltage can be preferably increased and it is more preferable to satisfy the relationship represented by formula: $(T_1/\in_1) > 30$. The upper limit is not limited, but practically approximately 133.

Figure 7:
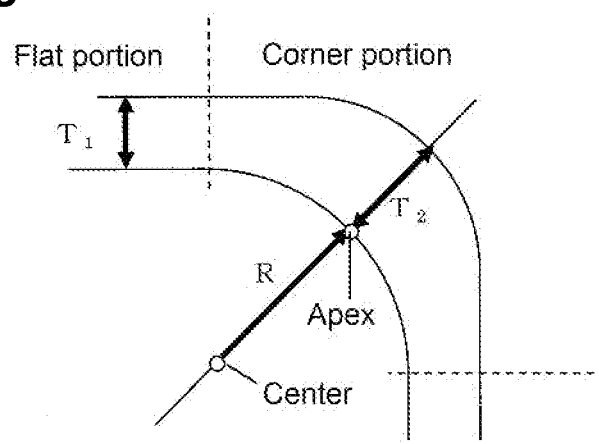
FIG. 7 is a pattern diagram showing a flat portion and a corner portion of an insulated wire of the present invention.

The thickness of the insulating layer can be measured using a scanning electron microscope (SEM), a commercially-available microscope, and the like. An observation magnification can be appropriately determined depending on the thickness of the insulating layer, but preferably approximately 400 times or more. The thickness ($T_1$) of the insulating layer at the flat portion is preferably uniform. In a case where the thickness of the insulating layer at the flat portion is uniform, a measuring point for $T_1$ can be appropriately determined. However, in a case where there is a variation in thickness, an average value is preferably used. In this case, measurement is preferably carried out by setting 5 points or more at an equal interval to calculate an average value. The thickness ($T_2$) of the corner portion does not have to be equal, and it is preferable that the thickness at the apex of the corner portion is at a maximum. $T_2$ in the present invention is defined as a thickness of the insulating layer lying on a straight line bonding a center of the conductor and an apex of the corner portion thereof, as shown in FIG. 7. In a rectangular conductor, 4 flat portions and 4 corner portions are present. In a case where thicknesses of the insulating layer at the 4 flat portions are different from one another and thicknesses of the insulating layer at 4 corner portions are different from one another, the thicknesses at the sites which provide respective minimum average values are defined as $T_1$ and $T_2$, respectively.

The thickness of the insulating layer is not particularly limited, as long as it is within the range which satisfies the above conditions, that is to say, the relationship represented by formula: $\in_1 < 3$ and $(T_2/\in_2) > (T_1/\in_1)$. However, from the viewpoint of maintaining a partial discharge inception voltage, the thickness ($T_1$) of the insulating layer is preferably at least 40 μm, more preferably at least 60 μm, particularly preferably at least 80 μm. From the viewpoint of a space factor, the upper limit is preferably 200 μm or less, more preferably 150 μm or less, and particularly preferably 100 μm or less.

The relative dielectric constant can be calculated from an electrostatic capacity of the insulating layer. The electrostatic capacity of the insulating layer can be measured using a commercially-available LCR meter and the like. Although a measuring temperature and a frequency may be changed as needed, in the present invention, these are values measured at 25° C. (by substance, it may be 25±5° C.) and 100 Hz, unless otherwise indicated. In a case where the cross-section of the conductor is rectangular, the electrostatic capacity Cp of the whole of the insulating layer is a total (Cp=Cf+Ce) of an electrostatic capacity Cf at a flat portion and an electrostatic capacity Ce at a corner portion. Specifically, provided that $L_1$ and $L_2$ respectively represent a length of a long side and a short side of the straight portion of the conductor, R represents a curvature radius of the conductor corner, Tf represents an average thickness at the flat portion of the insulating layer, Te represents an average thickness at the corner portion of the insulating layer, $\in_0$ represents a permittivity of vacuum, $\in_1$ represents a relative dielectric constant at the flat portion, and $\in_2$ represents a relative dielectric constant at the corner portion, the electrostatic capacity Cf at the flat portion and the electrostatic capacity Ce at the corner portion are expressed by the following formulae. Herein, Cf is a total electrostatic capacity at 4 flat portions, while Ce is a total electrostatic capacity at 4 corner portions. $L_1$ and $\in_2$ can be calculated from these formulae and measured electrostatic capacity (Cp, Cf, Ce) of the insulated wire. An average thickness Tf at a flat portion of the insulating layer used for calculation of the electrostatic capacity accords with while an average thickness Te at a corner portion of the insulating layer used for calculation of the electrostatic capacity does not always accord with $T_2$.

$$Cf = \in_1 \times \in_0 \times 2 \times (L_1 + L_2)/Tf \quad \text{Formula 1:}$$

$$Ce = \in_2 \times \in_0 \times 2 \times \pi / \text{Log}\{(R+Te)/R\} \quad \text{Formula 2:}$$

$$Cp = Cf + Ce \quad \text{Formula 3:}$$

(Foamed Layer)

The foamed layer is formed of a thermosetting resin incorporating therein bubbles. If the foamed layer is formed of the thermosetting resin, the foamed layer is excellent in mechanical strength, and therefore an effect of having difficulty in collapse of the bubbles is obtained. This thermosetting resin preferably has a glass transition temperature (Tg) of 200° C. or higher, more preferably 230° C. or higher, and particularly preferably 250° C. or higher. If the thermosetting resin has the glass transition temperature of 200° C. or higher, the resin has high heat resistance, and the foamed layer is hard to soften under high temperature, in which the bubbles do not collapse, and the relative dielectric constant becomes hard to rise. When the thermosetting resin has a plurality of glass transition temperatures, the lowest temperature is taken as the glass transition temperature. The thermosetting resin is not particularly limited, and specific examples preferably include polyamideimide (PAI) resins or polyimide (PI) resins. In view of the relative dielectric constant and the heat resistance, polyimide resins are particularly preferred. As a commercially available thermosetting resin, for example, a polyamideimide resin varnish (trade name: HI-406, manufactured by Hitachi Chemical Co., Ltd.), a polyimide resin varnish (trade name: U Imide, manufactured by Unitika Ltd.) can be used. These thermosetting resins can be used alone in one kind, or in combination of two or more kinds thereof.

Figure 8:
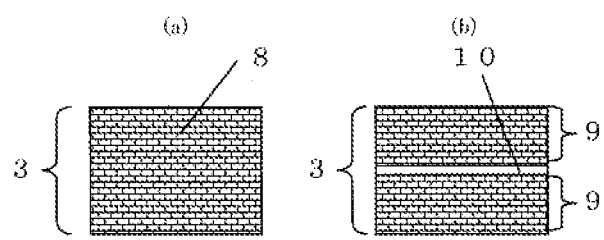
FIG. 8 is pattern diagrams showing foamed layers.

As shown in FIG. 8, the foamed layer may have a structure [FIG. 8(a)] in which bubbles are uniformly dispersed, or alternatively, from the viewpoint of mechanical properties of the foamed layer, may have a laminate structure [FIG. 8(b)] composed of a layer 9 incorporating therein bubbles and a layer 10 containing no bubble. A difference in the foamed layer between the layer 10 containing no bubble, and an inner non-foamed layer and an outer non-foamed layer as described below resides in that the former layer is present so as to be sandwiched between layers each containing bubbles, while as regards the inner non-foamed layer, one side thereof has contact with a conductor and as regards the outer non-foamed layer, there is nothing on one side thereof, or one side thereof has contact with an extruded layer containing no bubble. The layer containing no bubble increases a relative dielectric constant of the insulating layer, so that the total thickness of the layers each containing no bubble of the foamed layer is preferably 50% or less with respect to the thickness in the foamed layer, more preferably 40% or less, and particularly preferably 30% or less. The thickness per one layer of the layers each containing no bubble is preferably 5 μm or less, and particularly preferably 3 μm or less. The number of the layers each containing no bubble in the foamed layer is preferably in a range of 1 to 30, more preferably in a range of 5 to 20, and still more preferably in a range of 8 to 15. As to the resin materials which form the layer containing bubbles and the layer containing no bubble, the same material is preferably used from the viewpoint of interlayer adhesiveness.

Figure 9:
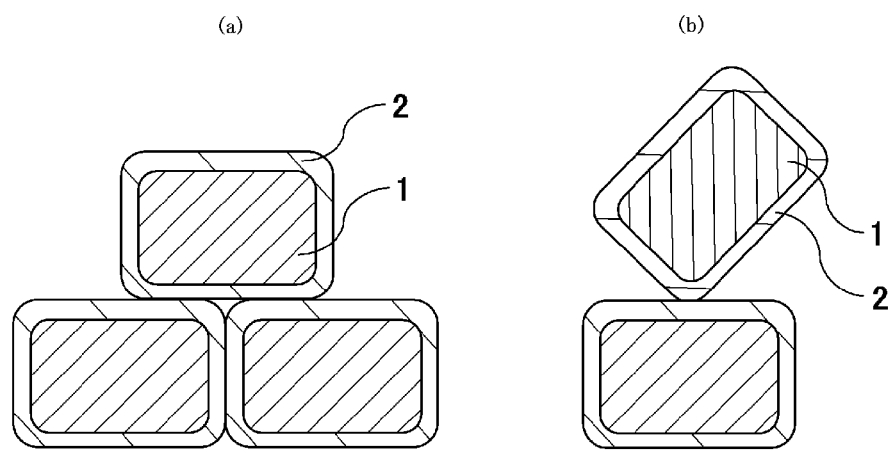
FIG. 9 is pattern diagrams showing voids formed by overlap of a corner portion and a flat area of a rectangular wire.

Herein, FIG. 9 is pattern diagrams showing voids at the corner portions of a rectangular wire, and both FIG. 9(a) and FIG. 9(b) show that wedge-shaped voids are formed in an adjoining area around the flat portion and the corner portion.

In FIG. 9(a), an approximate V-shaped void is formed in the center of a stack of three rectangular wires. Further, voids are formed between the flat portions of two aligned rectangular wires and right-and-left corner portions of one rectangular wire which is placed topside. Besides, in FIG. 9(b), of two rectangular wires, when a corner portion of an inclined topside rectangular wire is brought into contact with a downside rectangular wire, right-and-left spaces from the corner portion of the inclined topside rectangular wire result in voids.

The bubble is preferably an independent bubble which is not communicated with another bubble from the viewpoint of generation of a partial discharge in the bubble. As to the bubble, from the viewpoint of insulation properties, particularly generation of the partial discharge in the bubble, the maximum bubble size in the thickness direction of the insulating layer is preferably 10 μm or less, more preferably 5 μm or less, and particularly preferably 3 μm or less. The minimum bubble size is not particularly limited, but practically at least 1 nm. The bubble size can be measured by observing the cross-section of a foamed layer using a scanning electron microscope (SEM). For example, the bubble size is evaluated by measuring each size of arbitrarily-selected ten bubbles and then by calculating an arithmetic mean value of the measured values. The cross-section of the cell may have a rectangular shape, or alternatively may have an elliptical shape, or a circular form. From the viewpoint of reduction in permittivity, a rectangular shape is preferred.

A void volumetric ratio (void ratio) of the volume of a foamed layer is not limited, as long as it satisfies the above-described conditions, that is to say, the relationship represented by formula: $\epsilon_1 < 3$ and $(T_2/\epsilon_2) > (T_1/\epsilon_1)$. However, from the viewpoint of mechanical properties, the void ratio is preferably 70% or less, more preferably 60% or less, and particularly preferably 50% or less. From the viewpoint of permittivity, the lower limit of the void ratio is preferably at least 20%, more preferably at least 30%, and particularly preferably at least 40%. The void volumetric ratio (void ratio) of the volume of a foamed layer is, in a comprehensive manner, preferably in a range of 20 to 70%, more preferably in a range of 30 to 60%, and particularly preferably in a range of 40 to 50%. The void ratio of the foamed layer can be calculated from a density d of the foamed layer and a density do of a resin which forms the foamed layer using the following formula. As to each of the densities, for example, the value measured by an underwater substitution method is used.

$$\{1-(d/do)\} \times 100 [\%] \qquad \text{Formula 4:}$$

(Inner Non-Foamed Layer)

An inner non-foamed layer is disposed on the inner periphery of the foamed layer and is brought into contact with a conductor. The inner non-foamed layer may be a single layer or multiple layers. The number of the inner non-foamed layer is appropriately selected depending on, for example, thickness and productivity. This inner non-foamed layer contributes to improvement in heat resistance, dielectric breakdown property, tensile strength, abrasion resistance of the insulating layer, and adhesion to the conductor. The inner non-foamed layer is preferably composed of a resin which has heat resistance and can be varnished. By this, not only heat resistance of the insulating layer excels, but also the insulating layer can be continuously formed during the production process, so that a foreign substance or the like does not mix in an interface between the inner non-foamed layer and the foamed layer. Thus, a merit of improvement in quality is obtained. Specific preferred examples of resins for the inner non-foamed layer include polyamideimide (PAI), polyimide (PI), polyether imide (PEI), polyphenyl sulfone (PPSU), and polyether sulfone (PES). Among these, polyamideimide (PAI) and polyimide (PI) are particularly preferred. One kind thereof may be used solely, or two or more kinds thereof may be used by mix. Alternatively, different resins from one another may be laminated to form an inner non-foamed layer. Of the inner non-foamed layer, a resin which has a high strength of adhesion to a conductor is preferably selected for a surface thereof which is brought into contact with the conductor. Incorporation of additives for further improving the adhesion strength is particularly preferred. For example, in the case of a cupper conductor, a layer composed of a resin in which melamine was added to a polyamideimide resin is preferably disposed at a surface which contacts the conductor.

The thickness of the inner non-foamed layer is not limited, as long as it satisfies the above-described conditions, that is to say, the relationship represented by formula: $\epsilon_1 < 3$ and $(T_2/\epsilon_2) > (T_1/\epsilon_1)$. However, from the viewpoint of heat resistance, dielectric breakdown property, tensile strength, abrasion resistance of the insulating layer and adhesion to the conductor, the thickness is preferably at least 3 μm, more preferably at least 5 μm, and particularly preferably at least 10 μm. Practically, the upper limit of the thickness is 50 μm or less. From the viewpoint of permittivity of the insulating layer, the total thickness of an outer non-foamed layer and an extruded layer described below is preferably 60% or less, more preferably 50% or less, and particularly preferably 40% or less, of the overall thickness of an insulating layer.

(Outer Non-Foamed Layer)

An outer non-foamed layer is disposed on the outer periphery of the foamed layer. The outer non-foamed layer may be a single layer or multiple layers. The number of the outer non-foamed layer is appropriately selected depending on, for example, thickness and productivity. This outer non-foamed layer contributes to improvement in heat resistance, dielectric breakdown property, tensile strength, abrasion resistance of the insulating layer, and adhesion to the conductor, and also in a case where an extruded layer described below is applied, this outer non-foamed layer contributes to improvement in strength of adhesion to the extruded layer. The outer non-foamed layer is preferably composed of a resin which can be varnished. By this, not only heat resistance of the insulating layer excels, but also the insulating layer can be continuously formed during the production process, so that a foreign substance or the like does not mix in an interface between the outer non-foamed layer and the foamed layer. Thus, a merit of improvement in quality is obtained. Specific preferred examples of resins for the outer non-foamed layer include polyamideimide (PAI), polyimide (PI), polyether imide (PEI), polyphenyl sulfone (PPSU), and polyether sulfone (PES). Among these, polyamideimide (PAI) and polyimide (PI) are particularly preferred. One kind thereof may be used solely, or two or more kinds thereof may be used by mix. Alternatively, different resins from one another may be laminated to form an outer non-foamed layer. A material for improving resistance to partial discharge of the insulating layer may be contained in a part of the outer non-foamed layer. Specifically, preferable examples of the material include silica or titania each having a primary particle size of 200 nm or less. In a case where an extruded layer is applied onto the outer periphery of the outer non-foamed layer, a resin having a high strength of adhesion to the extruded layer is preferably selected for a surface to have contact with the extruded layer. Preferable examples thereof include the above-described polyetherimide, polyphenylsulfone, and polyethersulfone.

The thickness of the outer non-foamed layer is not limited, as long as it satisfies the above-described conditions, that is to say, the relationship represented by formula: $\epsilon_1 < 3$ and $(T_2/\epsilon_2) > (T_1-\epsilon_1)$. However, from the viewpoint of heat resistance, dielectric breakdown property, tensile strength, abrasion resistance of the insulating layer and adhesion to the extruded layer, the thickness is preferably at least 3 μm, more preferably at least 5 μm, and particularly preferably at least 10 μm. From the viewpoint of permittivity of the insulating layer, the total thickness of the above-described inner non-foamed layer and an extruded layer described below is preferably 60% or less, more preferably 50% or less, and particularly preferably 40% or less, of the overall thickness of an insulating layer. The upper limit of the thickness of the inner non-foamed layer is practically 100 μm.

The resin which forms the inner non-foamed layer and the outer non-foamed layer is not limited to the above-described resins, but these layers may be formed by a resin which reduces a relative dielectric constant and improves a mechanical strength with satisfaction of heat resistance. Specifically, a modified polyamideimide resin and a modified polyimide resin each of which reduces a relative dielectric constant and improves a mechanical strength can be used. This allows more reduction in a relative dielectric constant of the insulating layer and improvement in a mechanical strength such as a tensile property and an abrasion property. The foregoing resin which reduces a relative dielectric constant and improves a mechanical strength preferably has a glass transition point of at least 200° C.

The inner non-foamed layer and the outer non-foamed layer are a so-called solid layer substantially including no cells. Herein, "substantially including no cells" includes not only a case where the region includes no cells at all, but also a case where the region includes the cells to the extent that the region has no effect on the properties. For example, in an observed surface obtained by observing the cross section of the inner non-foamed layer using a scanning electron microscope (SEM), the inner non-foamed layer may include the cells as long as the number is one piece/cm$^2$ or less.

(Extruded Layer)

The extruded layer is disposed on the outer periphery of the outer non-foamed layer and is formed by subjecting a resin material containing a crystalline thermoplastic resin having a relative dielectric constant of 4 or less and a melting point of at least 260° C. to extrusion molding. Herein, the lower limit of the relative dielectric constant is preferably at least 2. The upper limit of the melting point is preferably 400° C. or less.

This extruded layer contributes to, for example, improvement in dielectric breakdown property of the insulating layer, enhancement of insulation properties, tensile strength, abrasion resistance, chemical resistance and heat resistance of the corner portion. Due to the relative dielectric constant of 4 or less, a low relative dielectric property of the insulating layer can be well maintained. Due to the melting point of at least 260° C., a heat resistance of the insulating layer can be well maintained. Examples of the crystalline thermoplastic resin which satisfies these requirements, include a polyester resin, a fluorine resin, a polyetheretherketone (PEEK) (including a modified polyetheretherketone), a thermoplastic polyimide (thermoplastic PI) and a polyphenylenesulfide (PPS). Among these, a polyetheretherketone, a thermoplastic polyimide, and a polyphenylenesulfide is particularly preferred in terms of especially low relative dielectric constant, high tensile elasticity, and excellent tensile strength and abrasion resistance. Examples of the commercially available thermoplastic resin include polyetheretherketone (manufactured by Solvay Specialty Polymers, trade name: KETASPIRE KT-820), thermoplastic polyimide (manufactured by Mitsui Chemicals, Inc., trade name: Aurum PL450C), and polyphenylene sulfide (manufactured by DIC Corporation, trade name: FZ-2100). The resin which forms an extruded layer may be a resin in which other resins or elastomer, various kinds of additives and the like are blended within a scope which does not affect heat resistance and insulation properties.

In the present invention, the relative dielectric constant of the crystalline thermoplastic resin used for the extruded layer is a value which is measured at a temperature of 25° C. (by substance, it may be 25±5° C.) and a frequency of 100 Hz. Specifically, after producing an extruded insulated wire in such a way that the above resin is extruded and coated to a conductor having a circular cross-section, the relative dielectric constant is calculated by means of the following formula.

$$\in r^* = Cp^* \cdot \text{Log}(b/a)/(2\pi \in_0) \quad \text{Formula 5:}$$

In the formula 5, $\in r^*$ represents a relative dielectric constant of the crystalline thermoplastic resin, $Cp^*$ represents an electrostatic capacity [pF/m] per unit length of the extruded insulated wire, "a" represents an outer diameter of the conductor, "b" represents an outer diameter of the insulated wire, $\in_0$ represents a permittivity of vacuum ($8.855 \times 10^{-12}$ [F/m]). $Cp^*$ can be measured by means of a commercially available LCR meter or the like, and "a" and "b" can be measured by means of a commercially available micrometer or the like. In the case of using the extruded insulated wire produced in such a way that the above-described crystalline thermoplastic resin is extruded and coated to a conductor having a rectangular cross-section, the relative dielectric constant can be calculated by the above-mentioned formula 1 to formula 3.

From the viewpoint that reduction in elastic modulus in the vicinity of a glass-transition point is suppressed and mechanical properties are exhibited at high temperature, crystallinity of a crystalline thermoplastic resin which forms an extruded layer is preferably increased. Specifically, the crystallinity is preferably 50% or more, more preferably 70% or more, and particularly preferably 80% or more. The crystallinity here is a value which can be measured using a differential scanning calorimetry (DSC) and indicates a degree of regularity in alignment of the crystalline thermoplastic resin. For example, in a case where PPS is used for the extruded layer, an adequate amount of PPS in a non-foamed region is weighed, and then temperature thereof is elevated, for example, at the rate of 5° C./min. During this stage, an endothermic amount (melting heat amount) due to melting that is observed at the region more than 300° C. and an exothermic amount (crystallization heat amount) due to crystallization that is observed at round 150° C. are calculated and a ratio of the heat amount in which the crystallization heat amount is deducted from the melting heat amount, with respect to the melting heat amount is defined as the crystallinity. This calculation formula is shown below.

$$\text{Film crystallinity (\%)} = [(\text{Melting heat amount} - \text{Crystallization heat amount})/(\text{Melting heat amount})] \times 100 \quad \text{Formula 6:}$$

Even in a case where crystalline thermoplastic resins other than PPS are used for the extruded layer, the film crystallinity can be calculated by the formula 6 in the same manner, although these other resins are different from the PPS in terms of melting heat peak temperature and crystallization peak temperature.

In the crystalline thermoplastic resin used in the extruded layer, various kinds of additives such as an antioxidant, an antistatic agent, an ultraviolet absorber, a photostabilizer, a fluorescent whitening agent, a pigment, a dye, a compatibilizing agent, a sliding agent, a toughening agent, a flame retardant, a crosslinking agent, a crosslinking aid, a wax, a plasticizer, a thickener, a viscosity reducing agent, an elastomer and the like my be blended within a scope which does not affect characteristics.

(Method of Forming Insulating Layer)

The foamed layer can be formed by coating appropriately more than once a varnish in which the above-described thermosetting resin has been dissolved in a particular several solvents, on a conductor or an inner non-foamed layer preliminarily formed on the conductor, and then by baking the varnish in a baking furnace. As to a method of coating a resin varnish, an ordinary method may be used. In a case of a conductor having a rectangular cross-section, examples of the method include a method of using a die which is called "a universal die" that is formed in the shape of a curb. A space between a longitudinal side and a transverse side of the universal die used for this rectangular conductor may be designed so that these sides are connected with a certain curvature. The conductors to which the resin varnish has been coated are baked in a baking furnace in a usual manner. Specific baking conditions depend on the shape of the furnace to be used. In a case of using a natural convection-type vertical furnace having the length of approximately 5 m, baking may be achieved by setting a transit time of 10 to 90 sec at 400 to 600° C.

It is preferable for the method of forming a foamed layer to use a foamable varnish in which a thermosetting resin has been mixed with a least one kind, preferably two or more kinds of solvents containing a specific organic solvent and at least one kind of a high boiling solvent.

The specific organic solvent for the foamable varnish used in the foamed layer acts as a solvent for dissolving the thermosetting resin. This organic solvent is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), dimethylsulfoxide, and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; and sulfone-based solvents such as sulfolane. Among these, in view of high solubility, high reaction promotion properties and the like, amide-based solvents and urea-based solvents are preferred; and in view of having no hydrogen atom that is apt to inhibit a crosslinking reaction due to heating and the like, N-methyl-2-pyrrolidone, N,N-dimethylacetamide, N,N-dimethylethyleneurea, N,N-dimethylpropyleneurea and tetramethylurea are further preferred, and N-methyl-2-pyrrolidone is particularly preferred. The boiling point of these organic solvents is preferably 160° C. to 250° C., and more preferably 165° C. to 210° C.

The high boiling solvent that can be used for bubble formation is a solvent having a boiling point of preferably 180° C. to 300° C., and more preferably 210° C. to 260° C.

Specific examples of the high boiling solvent include diethylene glycol dimethyl ether, triethylene glycol dimethyl ether, diethylene glycol dibutyl ether, tetraethylene glycol dimethyl ether, and tetraethylene glycol monomethyl ether. From the viewpoint of having a smaller fluctuation in the bubble size, triethylene glycol dimethyl ether is more preferred. In addition to the above solvents, the examples include dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, polyethylene glycol monomethyl ether, and propylene glycol monomethyl ether.

As the high boiling solvent, one kind thereof may be used, but at least two kinds thereof are preferably used in combination in that an effect of bubble generation over a wide temperature range is obtained. Preferred combinations of at least two kinds of the high boiling solvents include tetraethylene glycol dimethyl ether with diethylene glycol dibutyl ether, diethylene glycol dibutyl ether with triethylene glycol dimethyl ether, triethylene glycol monomethyl ether with tetraethylene glycol dimethyl ether, and triethylene glycol butyl methyl ether with tetraethylene glycol dimethyl ether. More preferred combinations include diethylene glycol dibutyl ether with triethylene glycol dimethyl ether, and triethylene glycol monomethyl ether with tetraethylene glycol dimethyl ether.

The high boiling solvent for bubble formation preferably has a boiling point higher than the boiling point of the solvent for dissolving the thermosetting resin, and when the solvent is added in one kind to the foamable varnish, the boiling point is preferably higher by 10° C. or more than the boiling point of the solvent for the thermosetting resin. Furthermore, in a case where one kind of the high boiling solvent is used, the high boiling solvent takes the role of both a bubble nucleating agent and a foaming agent. On the other hand, in a case where two or more kinds of the high boiling solvents are used, the solvent having the highest boiling point acts as a foaming agent, and a high boiling solvent for bubble formation having an intermediate boiling point acts as a bubble nucleating agent. The solvent having the highest boiling point preferably has a boiling point that is higher by 20° C. or more, and more preferably by 30° C. to 60° C., than the specific solvent. The high boiling solvent for bubble formation having the intermediate boiling point may have a boiling point that is intermediate between the boiling point of the solvent that acts as a foaming agent and the boiling point of the specific solvent, and preferably has a difference in boiling point of 10° C. or more from the boiling point of the foaming agent. In a case where the high boiling solvent for bubble formation having the intermediate boiling point has a higher solubility for the thermosetting resin than the solvent that acts as a foaming agent, uniform bubbles can be formed after baking of the foamable varnish. In a case where the two or more kinds of the high boiling solvents are used, the use ratio of the high boiling solvent having the highest boiling point to the high boiling solvent having the intermediate boiling point is, for example, preferably from 99/1 to 1/99 in terms of mass ratio, and more preferably from 10/1 to 1/10 in terms of easiness of bubble formation.

In order to form a foamed layer having a laminate structure composed of a layer containing bubbles and a layer containing no bubble as shown in FIG. 8(b), firstly, the above-described foamable varnish is coated and baked on a conductor to form a layer containing bubbles, and then a conventionally prepared resin varnish is coated and baked on the formed layer containing bubbles to form a layer containing no bubble. From here, a predetermined number of the layer containing bubbles and the layer containing no bubble are formed.

In particular, as a method of preparing a layer containing no bubble in an efficient way using a foamable varnish, there is a method of lowering the varnish temperature at the time of a varnish coating. Although the reason for this is uncertain, this phenomenon is thought to be probably due to growth inhibition of the bubble caused by partially suppressing evaporation by heat. Further, the preparation can be also carried out appropriately by a method of lowering evaporation efficiency by, for example, reducing a wind speed of the baking furnace. For example, if the varnish temperature is reduced to 15° C., or the wind speed is suppressed to 5 m/sec, a layer containing no bubble can be effectively prepared even using a foamable varnish.

The foamed layer is formed, by coating the above-described foamable varnish preferably several times, and baking the same. A method of coating the resin varnish may be a usual manner. A method of coating the resin varnish may be a usual manner. For example, when the conductor has a quadrangular cross-section, a method using a die called "universal die" that is formed in the shape of a curb can be exemplified. A space between a longitudinal side and a transverse side of the universal die used for this rectangular conductor may be designed so that these sides are connected with a certain curvature.

In the foamed layer, the thickness of a flat portion of the film can be controlled by an interspace between a universal die and a conductor or a flat portion of the inner non-foamed layer, that is to say, by a thickness of the foamable varnish to be coated. The longer the length of the interspace is, the more the thickness of the flat portion can be increased. Further, the thickness of the corner portion can be controlled by a curvature radius r at the connection point between a longitudinal side and a transverse side of the universal die. The smaller the curvature radius r is, the more the corner portion of the foamed layer thickens.

The interspace between a flat portion of the conductor or the inner non-foamed layer and a flat portion of the die is, at a maximum, preferably from 10 to 200 μm, and more preferably from 20 to 80 μm. If the interspace is too short, a coating becomes non-uniform. If the interspace is too long, poor appearance after baking is generated. Further, the curvature radius r of the portion having a curvature provided at a connection point between a longitudinal side and a transverse side of the universal die is usually in the range of 0.01 to 1.0 mm.

The inner non-foamed layer and the outer non-foamed layer can be formed by, preferably more than once, coating and baking the above-described resin varnish. The method of coating the resin varnish may be an ordinary method, and examples of the method include the method using the above-described universal die.

In the inner non-foamed layer and the outer non-foamed layer, the thickness of a flat portion of the film can be controlled by an interspace between a universal die and a flat portion of a conductor, that is to say, by a thickness of the varnish to be coated. The longer the length of the interspace is, the more the thickness of the flat portion can be increased. Further, the thickness of the corner portion can be controlled by curvature at the connection point between a longitudinal side and a transverse side of the universal die. The smaller the curvature radius r is, the more the corner portion of the foamed layer thickens.

The interspace between a flat portion of the conductor and a flat portion of the die is, at a maximum, preferably from 10 to 200 μm, and more preferably from 20 to 80 μm. If the interspace is too short, a coating becomes non-uniform. If the interspace is too long, poor appearance after baking is generated. Further, the curvature radius r of the portion having a curvature provided at a connection point between a longitudinal side and a transverse side of the universal die is usually in the range of 0.01 to 1.0 mm.

The conductors to which the resin varnish has been coated is baked in a baking furnace in a usual manner. Specific baking conditions depend on the shape and the like of the furnace to be used. In the case of using a natural convection-type vertical furnace having the length of approximately 5 m, baking may be achieved by setting a transit time of 10 to 90 sec at 400 to 500° C.

The extruded layer can be formed by extruding and molding the above-described thermoplastic resin on a foamed layer or an outer non-foamed layer. The conditions at the time of extrusion and molding, for example, condition of extruding temperature can be appropriately set depending on the thermoplastic resin to be used. For one example of a preferable extruding temperature, specifically, in order to make a melt viscosity suitable for extrusion coating, an extrusion temperature is set to a higher temperature by 30° C. or more, preferably approximately 40° C. to 60° C. than the melting point of the resin to be used. As just described, formation of an extruded covering resin layer by extrusion molding allows a decrease in the frequency of passing the extruded covering resin layer through a baking furnace during the production process. Thus, this method has the advantage that the insulating layer can be thickened without causing heat deterioration of the resin which forms a foamed layer, or without causing reduction in adhesion strength between a conductor and an insulating layer, resulting from oxidation of the conductor.

EXAMPLES

The present invention is described in more detail based on examples given below, but the present invention is not limited by the following examples. That is, the present invention is not construed to be limited by the above-mentioned embodiments and the following examples, and various modifications can be made within the scope of the technical matter of the present invention.

(Foamable PAI Varnish for Forming Foamed Layer)

In a 2 L volumetric separable flask, PAI varnish (HI-406 (trade name), manufactured by Hitachi Chemical Co., Ltd., solution of resin content: 33% by mass) was placed, and diethylene glycol dimethyl ether and triethylene glycol dimethyl ether as bubble forming agents were added thereto. Thus, a foamable PAI varnish for forming a foamed layer was obtained.

(Foamable PI Varnish for Forming Foamed Layer)

A foamable PI varnish for forming a foamed layer was obtained by putting 1,000 g of U imide (trade name, manufactured by Unitika Ltd., a NMP solution having a resin content of 25% by mass) into a 2 L-volume separable flask, and adding thereto 75 g of NMP, 50 g of diethyleneglycol dibutylether and 200 g of tetraethyleneglycol dimethylether as solvents.

(PAI Varnish for Forming Inner Non-Foamed Layer and Outer Non-Foamed Layer)

Into a 2 L-separable flask, PAI varnish (HI-406 (trade name), manufactured by Hitachi Chemical Co., Ltd., solution of resin content: 33 mass %) was put. Further, NMP was added thereto so as to make a solution having a resin content of 26% by mass, thereby obtaining a PAI varnish for forming an inner non-foamed layer and an outer non-foamed layer.

(PI Varnish for Forming Inner Non-Foamed Layer and Outer Non-Foamed Layer)

Into a 2 L-separable flask, PI varnish (U Imide (trade name), manufactured by Unitika Ltd., solution of resin content: 25 mass %) was put. Further, NMP was added thereto so as to make a solution having a resin content of 20% by mass, thereby obtaining a PI varnish for forming an inner non-foamed layer and an outer non-foamed layer.

(PPSU Varnish for Forming Outer Non-Foamed Layer)

200 g of RADEL R (trade name, manufactured by Solvay S.A.) as PPSU was dissolved in 1,000 g of NMP to make a solution having a resin content of 20% by mass, thereby obtaining a PPSU varnish for forming an outer non-foamed layer.

(PES Varnish for Forming Outer Non-Foamed Layer) 100 g of SUMIKAEXCEL 4100G (trade name, manufactured by Sumitomo Chemical Company, Limited) as PES was dissolved in 1,000 g of NMP to make a solution having a resin content of 10% by mass, thereby obtaining a PES varnish for forming an outer non-foamed layer.
(PEI Varnish for Forming Outer Non-Foamed Layer)

150 g of ULTEM 1000 (trade name, manufactured by GE Plastics, Limited) was dissolved in 1,000 g of NMP to make a solution having a resin content of 15% by mass, thereby obtaining a PEI varnish for forming an outer non-foamed layer.
(PPS for Forming Extruded Layer)

As PPS, FZ-2100 (trade name, manufactured by DIC Corporation) was used.
(PEEK for Forming Extruded Layer)

As PEEK, 450G (trade name, manufactured by Victrex Japan, Inc.) was used.
(Thermoplastic PI for Forming Extruded Layer)

As a thermoplastic PI, Aurum PL450C (trade name, manufactured by Mitsui Chemicals, Inc.) was used.
(Conductor)

As a conductor, a rectangular conductor (copper having an oxygen content of 15 ppm) having a cross-section of 1.8 mm×3.4 mm (thickness×width) and having a chamfer with a curvature radius of R=0.3 [mm] at four corners was used.

Example 1

An insulated wire shown in FIG. 1, having a foamed layer of the above PAI on the above conductor, was produced. Specifically, the foamable PAI varnish was coated to the conductor by means of a universal die having a curvature radius r=0.2 mm at the connection point between a longitudinal side and a transverse side of the universal die and then baking the varnish at a furnace temperature of 520° C. for 20 sec. per once, and then this process was repeated eight times, thereby forming the foamed layer of the above PAI, thereby obtaining an insulated wire of Example 1.

Example 2

An insulated wire shown in FIG. 2, having an inner non-foamed layer of the above PI and a foamed layer of the above PI on the above conductor, was produced. Specifically, the PI varnish was coated to the conductor by means of a universal die having a curvature radius r=0.3 mm at the connection point between a longitudinal side and a transverse side of the universal die and then baking the varnish at a furnace temperature of 520° C. for 20 sec. per once, and then this process was repeated four times, thereby forming the inner non-foamed layer of the above PI, and then baking the PI varnish thereon eight times, thereby forming the foamed layer of the above PI, thereby obtaining an insulated wire of Example 2.

Example 3

The insulated wire shown in FIG. 3, having an inner non-foamed layer of the above PAI, a foamed layer of the above PAI, and an outer non-foamed layer of the above PI on the above conductor, was produced. Specifically, the PAI varnish was coated to the conductor by means of a universal die having a curvature radius r=0.4 mm at the connection point between a longitudinal side and a transverse side of the universal die and then baking the varnish at a furnace temperature of 520° C. for 20 sec. per once, and then this process was repeated two times, thereby forming the inner non-foamed layer of the above PAI, and then baking the formable PAI varnish thereon eight times, thereby forming the foamed layer of the above PAI, and further baking the PI varnish thereon six times, thereby forming the outer non-foamed layer of the above PI, thereby obtaining an insulated wire of Example 3.

Example 4

An insulated wire shown in FIG. 4, having an inner non-foamed layer of the above PAI, a foamed layer of the above PAI, an outer non-foamed layer of the above PPSU and an extruded layer of the above PPS on the above conductor, was produced. Specifically, the PAI varnish was coated to the conductor by means of a universal die having a curvature radius r=0.4 mm at the connection point between a longitudinal side and a transverse side of the universal die and then baking the varnish at a furnace temperature of 520° C. for 20 sec. per once, and then this process was repeated six times, thereby forming the inner non-foamed layer of the above PAI, and then baking the PAI varnish thereon eight times, thereby forming the foamed layer of the above PAI, and further baking the PPSU varnish thereon twice, thereby forming the outer non-foamed layer. The extruded layer was formed by covering the obtained outer non-foamed layer with the above PPS resin using an extruder at a die temperature of 320° C. and resin pressure of 30 MPa, thereby obtaining an insulated wire of Example 4.

Example 5

The insulated wire shown in FIG. 5, having an inner non-foamed layer of the above PAI, a foamed layer of the above PAI, an outer non-foamed layer of the above PES and an extruded layer of the above PEEK on the above conductor, was produced. Specifically, the PAI varnish was coated to the conductor by means of a universal die having a curvature radius r=0.6 mm at the connection point between a longitudinal side and a transverse side of the universal die and then baking the varnish at a furnace temperature of 520° C. for 20 sec. per once, and then this process was repeated three times, thereby forming the inner non-foamed layer of the above PAI, and then baking the foamable PAI varnish thereon ten times, thereby forming the foamed layer of the above PAI, and further baking the PES varnish thereon four times, thereby forming the outer non-foamed layer. The extruded layer was formed by covering the obtained outer non-foamed layer with the above PEEK resin using an extruder at a die temperature of 400° C. and resin pressure of 30 MPa, thereby obtaining an insulated wire of Example 5.

Example 6

An insulated wire shown in FIG. 5, having an inner non-foamed layer of the above PAI, an foamed layer of the above PAI, an outer non-foamed layer of the above PEI and an extruded layer of the above thermoplastic PI on the above conductor, was produced. Specifically, the PAI varnish was coated to the conductor by means of a universal die having a curvature radius r=0.6 mm at the connection point between a longitudinal side and a transverse side of the universal die and then baking the varnish at a furnace temperature of 520° C. for 20 sec. per once, and then this process was repeated three times, thereby forming the inner non-foamed layer of the above PAI, and then baking the foamable PAI varnish thereon ten times, thereby forming the foamed layer of the above PAI, and further baking the PEI varnish thereon three times, thereby forming the outer non-foamed layer. The extruded layer was formed by covering the obtained outer non-foamed layer with the above thermoplastic PI resin using an extruder at a die temperature of 400° C. and resin pressure of 30 MPa, thereby obtaining an insulated wire of Example 6.

Example 7

The insulated wire shown in FIG. 6, having an inner non-foamed layer of the above PI, a foamed layer of the above PI, an outer non-foamed layer of the above PEI and an extruded layer of the above PEEK on the above conductor, was produced. Specifically, the PI varnish was coated to the conductor by means of a universal die having a curvature radius r=0.7 mm at the connection point between a longitudinal side and a transverse side of the universal die and then baking the varnish at a furnace temperature of 520° C. for 20 sec. per once, and then this process was repeated three times, thereby forming the inner non-foamed layer of the above PI, and then baking the foamable PI varnish thereon eight times, thereby forming the foamed layer of the above PI, and further baking the PEI varnish thereon three times, thereby forming the outer non-foamed layer. The extruded layer was formed by covering the obtained outer non-foamed layer with the above PEEK resin using an extruder at a die temperature of 400° C. and resin pressure of 30 MPa, thereby obtaining an insulated wire of Example 7.

Comparative Example 1

Figure 10:
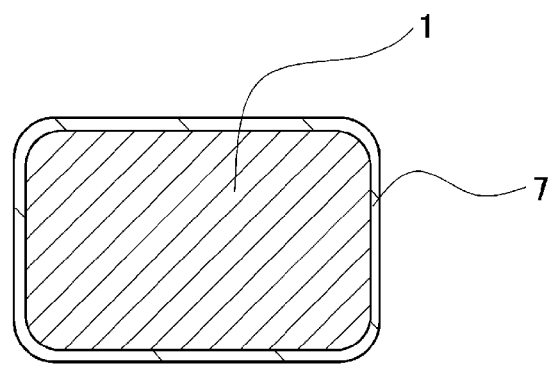
FIG. 10 is a cross-sectional view schematically showing one example of a conventional insulated wire.

An insulated wire shown in FIG. 10, having an inner non-foamed layer of the above PAI as an insulating layer on the above conductor, was produced. Specifically, the PAI varnish was coated to the conductor by means of a universal die having a curvature radius r=0.5 mm at the connection point between a longitudinal side and a transverse side of the universal die and then baking the varnish at a furnace temperature of 520° C. for 20 sec. per once, and then this process was repeated sixteen times, thereby forming the insulating layer of the above PAI and obtaining an insulated wire of Comparative Example 1.

Comparative Example 2

Figure 11:
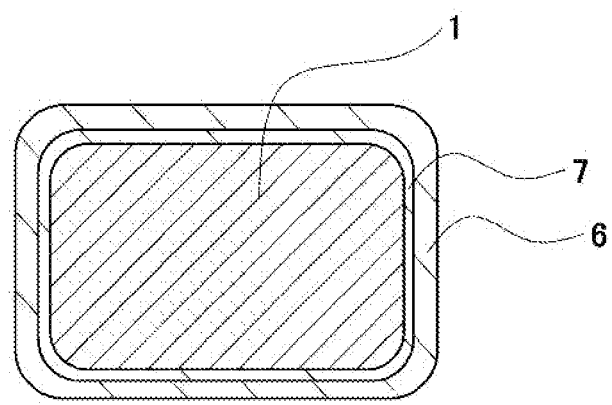
FIG. 11 is a cross-sectional view schematically showing another example of a conventional insulated wire.

An insulated wire shown in FIG. 11, having a PAI layer composed of the PAI varnish prepared for the above inner non-foamed layer and an extruded layer of the above PEEK on the above conductor, was produced. Specifically, the extruded layer was formed by coating the above PEEK resin on the outer periphery of the insulated wire obtained in Comparative Example 1 using an extruder at a die temperature of 400° C. and resin pressure of 30 MPa, thereby obtaining the insulated wire of Comparative Example 2.

The following evaluation was conducted with respect to the thus-obtained insulated wires of Examples 1 to 7 and Comparative Examples 1 to 2 produced. The results are shown in Table 1.

(Relative Dielectric Constant)

After measuring an electrostatic capacity of the insulated wire, a relative dielectric constant was calculated from the measured electrostatic capacity, a size of the conductor and a thickness of the insulating layer on the basis of the above-described formulas. For the measurement of the electrostatic capacity, LCR HITESTER (manufactured by Hioki E.E. Corp., Model 3532-50) was used. Measurement was conducted at 25° C. The case where the relative dielectric constant $\in_1$ of the flat portion was less than 3 was judged to be acceptable and is indicated by "B". The case where the relative dielectric constant $L_1$ was 2.5 or less was judged to be excellent in particular and is indicated by "A". The case where the relative dielectric constant $\in_1$ was 3 or more was judged to be not acceptable and is indicated by "C".

(Partial Discharge Inception Voltage)

A partial discharge inception voltage was measured, using a partial discharge tester "KPD2050" (trade name), manufactured by Kikusui Electronics Corp. Measurement of the partial discharge inception voltage was carried out with respect to each of the flat portion and the corner portion of the rectangular wire. For measurement of the flat portion, with reference to the cross-section of two insulated wires, a sample was used in which surfaces of the long side were superimposed over the length of 100 mm in a longitudinal direction of the rectangular wire. For measurement of the corner portion, with reference to the cross-section of one rectangular wire, a sample was used in which one surface of the long side was brought into a contact with the corner portion of another rectangular wire over the length of 100 mm in a longitudinal direction of the rectangular wire. An AC voltage with a sine wave of 50 Hz was applied between conductors of these two rectangular wires and voltage increase was carried out at a constant rate of 50 V/sec and a voltage at the time when a partial discharge of 10 pC generated was measured. Measurement was carried out at 25° C.

The case where a measured value of the partial discharge inception voltage was 0.7 kV (effective value) or more was judged to be acceptable and is indicated by "B". The case where the measured value was 1 kV (effective value) or more was judged to be excellent in particular and is indicated by "A". The case where the measured value was less than 0.7 kV (effective value) was judged to be not acceptable and is indicated by "C".

(Overall Evaluation)

For overall evaluation, the case where all of the evaluations in each of the above-described tests were "A" was judged to be excellent in particular and the overall evaluation is indicated by "A". The case where the evaluations in the above-described tests were "B" and "A" was judged to be acceptable and the overall evaluation is indicated by "B". The case where any of the evaluations in the above-described tests was "C" was judged to be not acceptable and the overall evaluation is indicated by "C".

TABLE 1

| | | | Ex 1 | Ex 2 | Ex 3 | Ex 4 | Ex 5 |
|---|---|---|---|---|---|---|---|
| Conductor | Cross-sectional shape | | Rectangular (square) | Rectangular (square) | Rectangular (square) | Rectangular (square) | Rectangular (square) |
| | Curvature radius of corner portion | mm | 0.3 | 0.3 | 0.3 | 0.3 | 0.3 |
| Foamed layer | Presence (○)/Not Presence (—) | | ○ | ○ | ○ | ○ | ○ |
| | Material | | PAI | PI | PAI | PAI | PAI |
| | Thickness of flat portion t1a | μm | 40 | 40 | 40 | 40 | 50 |

TABLE 1-continued

| | | | | | | | |
|---|---|---|---|---|---|---|---|
| | Thickness of corner portion t2a | µm | 50 | 50 | 50 | 50 | 50 |
| | Relative dielectric constant | | 2.2 | 1.8 | 2.2 | 2.2 | 2.2 |
| Inner non-foamed layer (non-foamed layer on conductor) | Presence (○)/Not Presence (—) | | — | ○ | ○ | ○ | ○ |
| | Material | | — | PI | PAI | PAI | PAI |
| | Thickness of flat portion t1b | µm | — | 10 | 5 | 15 | 5 |
| | Thickness of corner portion t2b | µm | — | 10 | 5 | 15 | 5 |
| | Relative dielectric constant | | — | 3.5 | 4.2 | 4.2 | 4.2 |
| Outer non-foamed layer | Presence (○)/Not Presence (—) | | — | — | ○ | ○ | ○ |
| | Material | | — | — | PI | PPSU | PES |
| | Thickness of flat portion t1c | µm | — | — | 15 | 5 | 5 |
| | Thickness of corner portion t2c | µm | — | — | 15 | 5 | 5 |
| | Relative dielectric constant | | — | — | 3.5 | 3.8 | 3.5 |
| Extruded layer | Presence (○)/Not Presence (—) | | — | — | — | ○ | ○ |
| | Material | | — | — | — | PPS | PEEK |
| | Thickness of flat portion t1d | µm | — | — | — | 20 | 20 |
| | Thickness of corner portion t2d | µm | — | — | — | 20 | 40 |
| | Relative dielectric constant | | — | — | — | 3.3 | 3.1 |
| | Melting point | ° C. | — | — | — | 278 | 343 |
| Insulating layer | Thickness of flat portion $T_1$ | µm | 40 | 50 | 60 | 80 | 80 |
| | Relative dielectric constant of flat portion $\epsilon_1$ | | 2.2 | 2.0 | 2.5 | 2.8 | 2.5 |
| | ($T_1/\epsilon_1$) | | 18 | 25 | 24 | 29 | 32 |
| | Thickness of corner portion $T_2$ | µm | 50 | 60 | 70 | 90 | 100 |
| | Relative dielectric constant of corner portion $\epsilon_2$ | | 2.2 | 2.0 | 2.5 | 2.7 | 2.6 |
| | ($T_2/\epsilon_2$) | | 23 | 30 | 28 | 33 | 38 |
| Insulated wire properties | Relative dielectric constant $\epsilon_1$ | | 2.2 | 2.0 | 2.5 | 2.8 | 2.5 |
| | | Evaluation | A | A | A | B | A |
| | Partial discharge inception voltage | kV | 0.78 | 0.90 | 0.89 | 0.97 | 1.03 |
| | | | 0.83 | 0.96 | 0.93 | 1.02 | 1.10 |
| | Upper row: flat portion Lower row: corner portion | Evaluation | B | B | B | B | A |
| | Overall evaluation | | B | B | B | B | A |

| | | | Ex 6 | Ex 7 | C Ex 1 | C Ex 2 |
|---|---|---|---|---|---|---|
| Conductor | Cross-sectional shape | | Rectangular (square) | Rectangular (square) | Rectangular (square) | Rectangular (square) |
| | Curvature radius of corner portion | mm | 0.3 | 0.3 | 0.3 | 0.3 |
| Foamed layer | Presence (○)/Not Presence (—) | | ○ | ○ | — | — |
| | Material | | PAI | PI | — | — |
| | Thickness of flat portion t1a | µm | 50 | 50 | — | — |
| | Thickness of corner portion t2a | µm | 50 | 40 | — | — |
| | Relative dielectric constant | | 2.2 | 1.8 | — | — |
| Inner non-foamed layer (non-foamed layer on conductor) | Presence (○)/Not Presence (—) | | ○ | ○ | ○ | ○ |
| | Material | | PAI | PI | PAI | PAI |
| | Thickness of flat portion t1b | µm | 5 | 5 | 40 | 40 |
| | Thickness of corner portion t2b | µm | 5 | 5 | 40 | 40 |
| | Relative dielectric constant | | 4.2 | 3.5 | 4.2 | 4.2 |

TABLE 1-continued

| | | | | | | |
|---|---|---|---|---|---|---|
| Outer non-foamed layer | Presence (○)/Not Presence (—) | | ○ | ○ | — | — |
| | Material | | PEI | PEI | — | — |
| | Thickness of flat portion t1c | μm | 5 | 5 | — | — |
| | Thickness of corner portion t2c | μm | 5 | 5 | — | — |
| | Relative dielectric constant | | 3.2 | 3.2 | — | — |
| Extruded layer | Presence (○)/Not Presence (—) | | ○ | ○ | — | ○ |
| | Material | | Thermoplastic PI | PEEK | — | PEEK |
| | Thickness of flat portion t1d | μm | 20 | 40 | — | 40 |
| | Thickness of corner portion t2d | μm | 40 | 70 | — | 50 |
| | Relative dielectric constant | | 3.2 | 3.1 | — | 3.1 |
| | Melting point | °C. | 388 | 343 | — | 343 |
| Insulating layer | Thickness of flat portion $T_1$ | μm | 80 | 100 | 40 | 80 |
| | Relative dielectric constant of flat portion $\epsilon_1$ | | 2.5 | 2.3 | 4.2 | 3.6 |
| | $(T_1/\epsilon_1)$ | | 32 | 43 | 10 | 22 |
| | Thickness of corner portion $T_2$ | μm | 100 | 120 | 40 | 90 |
| | Relative dielectric constant of corner portion $\epsilon_2$ | | 2.6 | 2.5 | 4.2 | 3.6 |
| | $(T_2/\epsilon_2)$ | | 38 | 48 | 10 | 25 |
| Insulated wire properties | Relative dielectric constant $\epsilon_1$ | Evaluation | 2.5<br>A | 2.3<br>A | 4.2<br>C | 3.6<br>C |
| | Partial discharge inception voltage<br>Upper row: flat portion<br>Lower row: corner portion | kV<br><br><br>Evaluation | 1.03<br>1.11<br><br>A | 1.21<br>1.26<br><br>A | 0.59<br>0.57<br><br>C | 0.85<br>0.88<br><br>B |
| | Overall evaluation | | A | A | C | C |

"Ex" means Example according to the present invention, and "C Ex" means Comparative Example.

As shown in the above Table 1, it was found that in a case where the insulating layer had a foamed layer composed of a thermosetting resin (In Examples, polyamideimide and polyimide were exemplified) containing bubbles, the relative dielectric constant of the insulating layer was able to be small and the relative dielectric constant $\epsilon_1$ of the flat portion of less than 3 was achieved, and the partial discharge inception voltage was able to be enhanced. Specifically, as seen from the comparison between Example 1 and Comparative Example 1 and the comparison between Examples 4 to 6 and Comparative Example 2, even though the resin of the insulating layer was the same, a higher partial discharge inception voltage was achieved by Example 1 and Examples 4 to 6 than Comparative Example 1 and Comparative Example 2.

Further, it was found that, by satisfying the relationship represented by formula: $(T_2/\epsilon_2)>(T_1/\epsilon_1)$, in which $T_1$ [μm] represents a thickness of the flat portion; $\epsilon_1$ represents a relative dielectric constant of the flat portion; $T_2$ [μm] represents a thickness of the corner portion; and $\epsilon_2$ represents a relative dielectric constant of the corner portion; the insulation property of the corner portion was enhanced and reduction in the partial discharge inception voltage of the corner portion was able to be suppressed. Specifically, as shown in Examples 1 to 7 and Comparative Example 1, Examples 1 to 7 each of which satisfies the above relationship, the partial discharge inception voltage of the corner portion is higher than that of the flat portion. In Comparative Example 1 which does not satisfy the above relationship, the partial discharge inception voltage of the corner portion is lower than that of the flat portion.

Further, it was found that the partial discharge inception voltage was able to be further enhanced by satisfying the relationship represented by formula: $(T_1/\epsilon_1)>15$. Specifically, as shown in Examples 1 to 7, the partial discharge inception voltage at both the flat portion and the corner portion can be increased to at least 0.7 kV by satisfying this relationship.

Further, in a case where non-foamed layers were provided on the inner periphery and the outer periphery of the foamed layer, the partial discharge inception voltage could be enhanced. In a case where an extruded layer was provided, the partial discharge inception voltage could be further enhanced. Specifically, these effects are shown in Examples 4 to 7.

As mentioned above, in the insulated wire of the present invention, since a permittivity of the insulating layer thereof is very low, even if the insulating layer is thin, a partial discharge inception voltage is high. Further it was found that due to enhancement of insulation properties at the corner portion of the rectangular wire, reduction in the partial discharge inception voltage at the corner portion was able to be suppressed.

INDUSTRIAL APPLICABILITY

As mentioned above, even if the insulating film is thin, the insulated wire of the present invention, in which a partial discharge inception voltage is high and an insulating property at corner portion of a rectangular wire has been strengthened, can be used for an insulated wire in the field which requires withstanding voltage and heat resistance, for example, including a variety of electric/electronic devices as well as automobiles, specifically coils for electric devices such as inverter-related devices, high-speed switching devices, inverter motors and transformers, and space electric devices, aircraft electric devices, nuclear electric devices, energy electric devices, automotive electric devices and the like. In particular, it is favorable as winding wires for the driving motor of HV (hybrid vehicle) and EV (electric vehicle).

By using the insulated wire of the present invention for motors and transformers, high-performance electric/electronic devices can be provided.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Conductor
2 Insulating layer
3 Foamed layer
4 Inner non-foamed layer
5 Outer non-foamed layer
6 Extruded layer
7 Enamel
8 Bubble
9 Layer containing bubbles
10 Layer containing no bubble
R Curvature radius of corner portion
$T_1$ Thickness of flat portion
$T_2$ Thickness of corner portion

The invention claimed is:

1. An insulated wire having a rectangular shaped cross-section, comprising:
a conductor having a rectangular shaped cross-section; and
an insulating layer coated to the conductor,
wherein the insulating layer has a foamed layer composed of a thermosetting resin containing bubbles, the cross-section of the insulating layer has a shape composed of a flat portion and a corner portion, and the insulating layer satisfies the relationship represented by the following formula:

$$\in_1 < 3 \text{ and } (T_2/\in_2) > (T_1/\in_1)$$

wherein $T_1$ [μm] represents a thickness of the flat portion; $\in_1$ represents a relative dielectric constant of the flat portion; $T_2$ [μm] represents a thickness of the corner portion; and $\in_2$ represents a relative dielectric constant of the corner portion.

2. The insulated wire according to claim 1, wherein the insulating layer further satisfies the relationship represented by formula: $(T_1/\in_1) > 15$.

3. The insulated wire according to claim 1, comprising non-foamed layer containing no bubble, on the inner periphery and/or the outer periphery of the foamed layer.

4. The insulated wire according to claim 1, wherein the foamed layer comprises at least one thermosetting resin selected from the group consisting of a polyamideimide resin and a polyimide resin.

5. The insulated wire according to claim 1,
wherein the insulating layer comprises an extruded layer, and
wherein the extruded layer comprises a crystalline thermoplastic resin having a relative dielectric constant of 4 or less and a melting point of 260° C. or more.

6. An electric/electronic equipment, a motor, or a transformer, comprising the insulated wire according to claim 1.

* * * * *